3,414,085
CENTRALIZED LUBRICATING SYSTEM
Hiroshi Fujita, Notogawacho, Japan, assignor to Daikin Kogyo Co., Ltd., Osaka, Japan, a corporation of Japan
Filed Feb. 1, 1966, Ser. No. 524,268
Claims priority, application Japan, Feb. 3, 1965 (utility models), 40/7,820, 40/7,821; Feb. 5, 1965, 40/6,471
4 Claims. (Cl. 184—7)

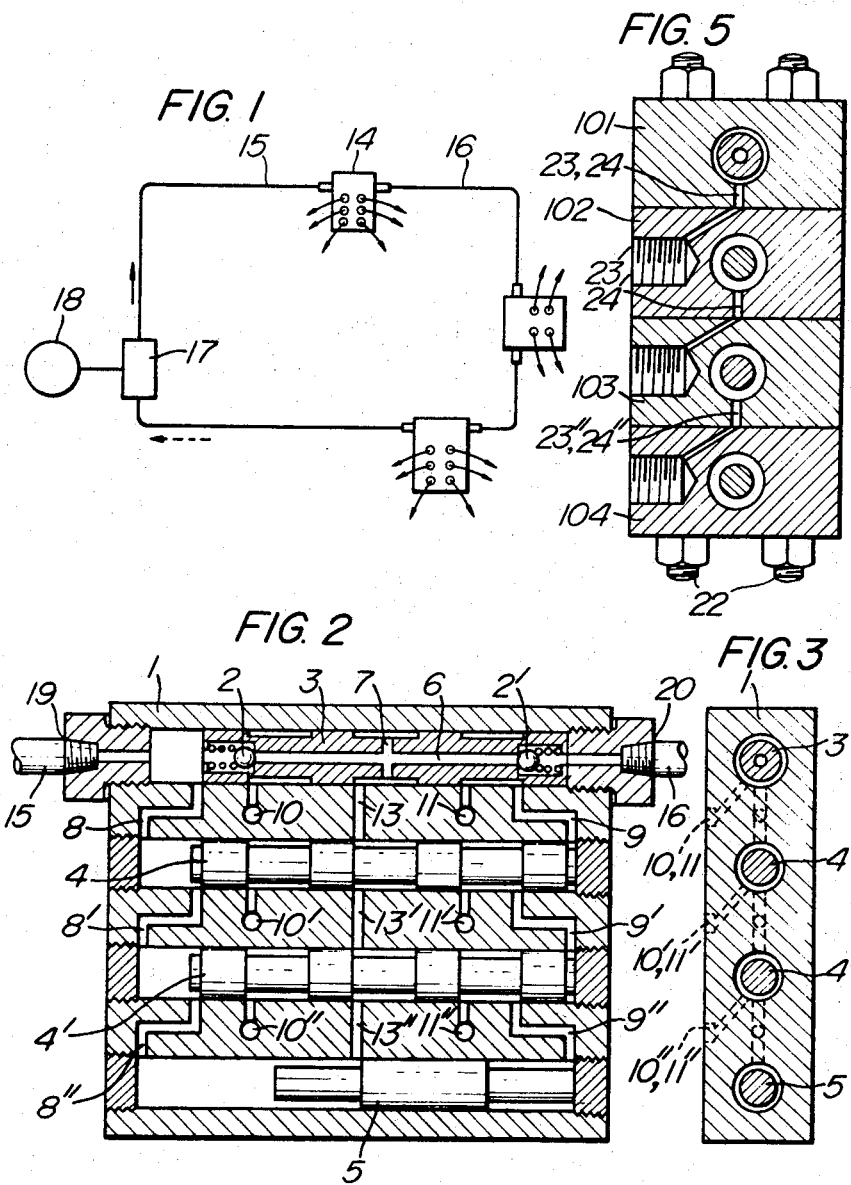

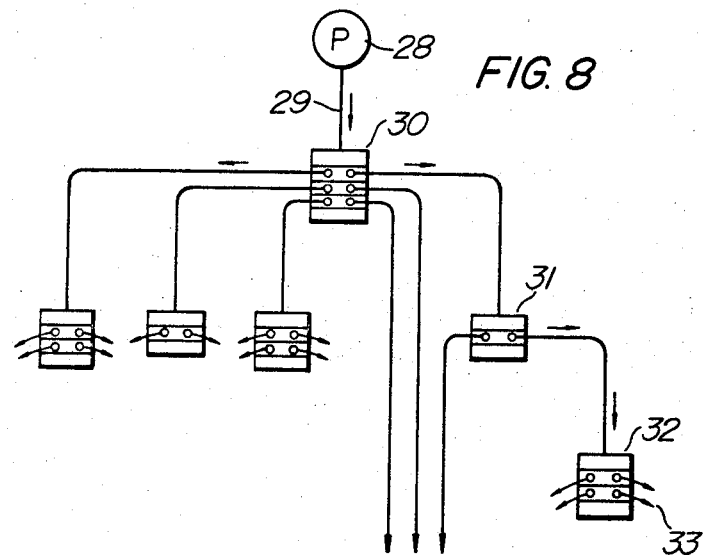
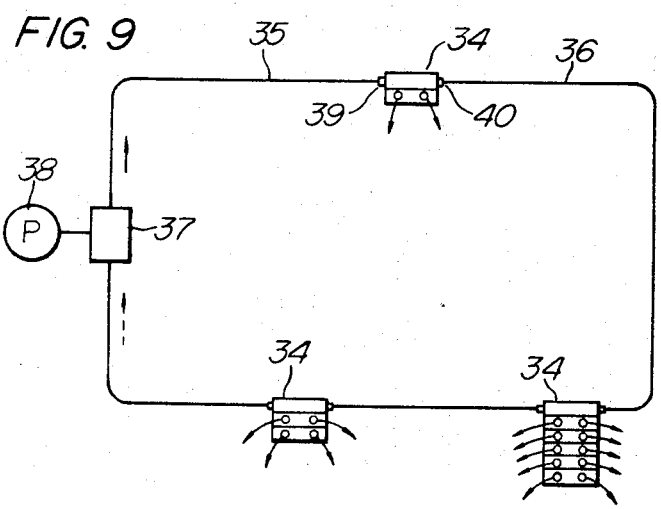

ABSTRACT OF THE DISCLOSURE

A distributing valve assembly of the type adapted to be connected in series with another like distributing valve assembly in a loop of pipe in a centralized lubricating system comprising a pilot plunger having a check valve at either end for controlling the passage of lubricant, a plurality of metering plungers, and a metering-change over plunger. Passageways are provided at the ends of the plungers to allow the lubricant to be distributed by the successive operation of the metering plungers, and a central lubricant return passageway communicates with the center of the metering-change over plunger and the pilot plunger to allow the lubricant to exit through one of the check valves after movement of the metering-change over plunger.

---

The present invention relates to distributing valve assemblies of centralized lubricating systems.

Centralized lubricating systems are used for supplying a lubricant to a number of moving parts to be lubricated in a machine automatically and concentrically, and various forms of such centralized lubricating systems have been proposed heretofore. These centralized lubricating systems comprise a central pump means for supplying a lubricant under pressure and a desired number of lubricant distributing valve assemblies connected with said central pump means through a pipe line (lubricant main pipe), from which the lubricant is distributed to a number of parts to be lubricated. Such lubricant distributing valve assemblies of centralized lubricating system are required to be capable of distributing a lubricant in a predetermined quantity to a desired number of parts to be lubricated automatically in a positive manner. The present invention is concerned with the construction of distributing valve assemblies as a critical part of a centralized lubricating system, which has been devised based on a novel concept.

More specifically, according to the present invention, there is provided a distributing valve assembly of the type which is adapted to be connected with each other in series in single line loop of lubricant main pipe. A distributing valve assembly of the type in which plungers are arranged therein for progressive movement has been proposed, for example, by U.S. Patent No. 2,986,234. This type of distributing valve assembly, however, requires a total of four lubricant passage lines consisting of the pipes for changing the lubricant passage to the principal body of distributing valve assembly and the passageways for the operation of plungers, and moveover the pipe arrangement becomes complicated.

The distributing valve assembly of the present invention is of the type in which change over passageways and passageways for the operation of plungers are composed of three passage lines and the construction of these passageways is simplified so that they may be arranged within the body of valve assembly integrally and there is only one main pipe, mentioned above, extending externally of the distributing valve assembly. For this purpose, the distributing valve assembly of the present invention comprises a pilot plunger having check valves at both ends thereof and arranged between connecting ports for said main pipe, a desired number of metering plungers of a known type arranged in the intermediate portion and a metering-change over plunger arranged at the end extremity, each of said plungers being fitted in the respective plunger chamber formed in the body of the valve assembly, in said distributing valve assembly there being formed adjacent both ends of each plunger chamber two passage lines for the reciprocatory movement of the metering plungers and the metering-change over plunger in association with the operation of said pilot plunger, either one of said passageways communicating with a central lubricant return passage line formed between the center of the metering-change over plunger chamber and said pilot plunger and said central lubricant return passageway communicating with a distributing valve assembly of the next stage through passageways formed in the pilot plunger and the check valve for the circulation of lubricant therethrough.

An object of the present invention, therefore, is to provide a distributing valve assembly of centralized lubricating system of the type which is adapted, in a plural number, to be connected with each other in series in a loop of one main pipe at connecting ports for said main pipe, said distributing valve assembly comprising a pilot plunger having check valves at both ends thereof and arranged between said main pipe connecting ports, a desired number of metering plungers arranged in the intermediate portion and a metering-change over plunger arranged at the end extremity, each of said plungers being fitted in the respective plunger chamber formed in the body of valve assembly for sliding movement over a definite stroke therein, in said distributing valve assembly there being formed adjacent both ends of each plunger chamber passageways for the reciprocatory movement of said metering plungers and said metering-change over plunger in association with the operation of said pilot plunger to supply lubricant and said passageways alternately communicating with a central lubricant return passageway communicating the center of said metering-change over plunger chamber with a passageway formed in said pilot plunger as said metering-change over plunger operates.

According to another embodiment of the present invention, the distributing valve assembly is divided into a main valve element, a plurality of distributing valve elements and a metering-change over valve element and these elements are assembled into an integral part in a suitable manner so as to perform the same operation as that of the distributing valve assembly described in the preceding embodiment. Such a separable valve assembly has advantages which will be mentioned later.

Another object of the present invention, therefore, is to provide a distributing valve assembly of centralized lubrictaing system as described previously, characterized in that said distributing valve assembly is divided into a main valve element with said pilot plunger fitted therein, a desired number of distributing valve elements each having said metering plunger fitted therein and a metering-change over valve element with said metering-change over plunger fitted therein, and these valve elements are detachably assembled into an integral part.

In another embodiment of the present invention, an improvement was made so as to operate the check valves provided at both ends of said pilot plunger for only a short period of time in order to maintain a positive performance of said check valves.

Another object of the present invention, therefore, is to provide a distributing valve assembly of centralized lubricating system of the type which is adapted, in a plural member, to be connected with each other in series in a loop of one main pipe at connecting ports for said main pipe, said distributing valve assembly comprising a pilot plunger having check valves for controlling a circulating lubricant passage at both ends thereof and arranged between said main pipe connecting ports, a desired number of metering plungers arranged in the intermediate portion and a metering-change over plunger arranged at the end extremity, each of said plungers being fitted in the respective plunger chamber formed in the body of valve assembly for sliding movement over a definite length of stroke therein, in said distributing valve assembly there being formed adjacent both ends of each plunger chamber passageways for the progressive movement of said metering plungers and said metering-change over plunger in association with the operation of said pilot plunger to supply lubricant and said passageways alternately communicating with a central lubricant return passageway communicating with the center of said metering-change over plunger chamber with a passageway formed in said pilot plunger in relation to the operation of said metering-change over plunger and said central lubricant return passageway being formed such that it communicates with said check valve on the lubricant return side through a central passageway formed in said pilot plunger only when said pilot plunger is located near the end of its stroke and does not communicate with said check valve on the lubricant supply side.

According to another embodiment of the present invention, there is provided, as a separable type of the distributing valve assembly illustrated in the second embodiment above, a distributing valve assembly of centralized lubricating system as described in the preceding paragraph, characterized in that said distributing valve assembly is divided into the main valve element with said pilot plunger fitted therein, a desired number of distributing valve elements each having said metering plunger fitted therein and a metering-change over valve element with said metering-change over plunger fitted therein and these valve elements are detachably assembled into an integral part.

The present invention will now be described in further detail with reference to the accompanying drawings, in which:

FIGURE 1 is a circuit diagram of a centralized lubricating system in which the distributing valve assemblies of the present invention are connected with each other in single line loop of a main pipe;

FIGURE 2 is a cross-sectional front elevation of a first embodiment of the distributing valve assembly according to the present invention;

FIGURE 3 is a cross-sectional side elevation of the same;

FIGURE 5 is a cross-sectional side view of the same;

FIGURE 8 is a circuit diagram of a prior art centralized lubricating system corresponding to the second embodiment of the present invention; and FIGURE 9 is a circuit diagram of the second embodiment of the invention.

Figure 4:
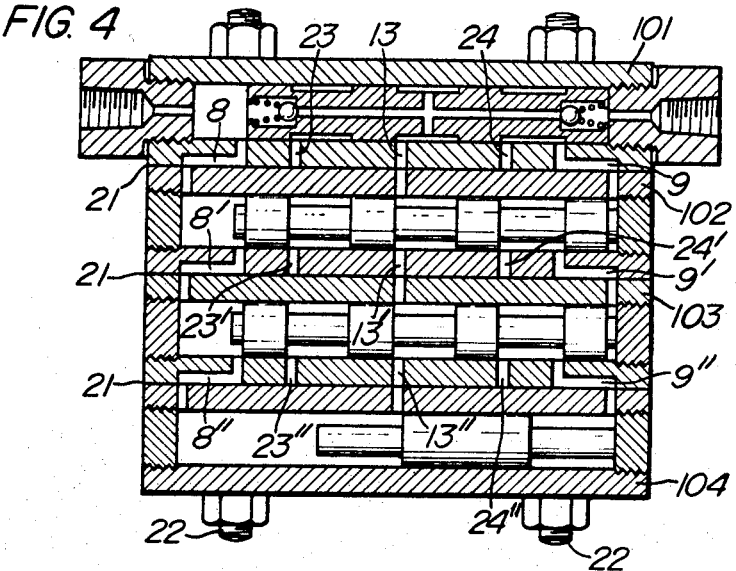
FIGURE 4 is a cross-sectional front elevation of a second embodiment of the distributing valve assembly of the present invention.

In the embodiment shown in FIGURES 2 and 3, there are arranged, in a valve body 1, a pilot plunger 3 sealably and slidably fitted between main pipe connecting ports 19, 20, said pilot plunger having provided therein at opposite ends check valves 2, 2' for controlling the lubricating passageway, and a desired number of metering plungers 4, 4' and metering-change over plunger 5 fitted in the same manner as and in parallel relation to said pilot plunger, said metering-change over plunger being located most externally of the valve body. The pilot plunger is formed therein with passageways 6 and 7 and the check valves 2, 2' are provided at both exit ends of the passageway 6 in such a manner that said check valves 2, 2' respectively prevent the reverse flow of lubricant through the main pipe connecting ports 19, 20. The plungers mentioned above are communicating with each other through a total of three lubricant passage lines, i.e. two passage lines 8, 8', 8'' and 9, 9', 9'' formed adjacent both ends of each plunger chamber and a central lubricant return passage line 13, 13', 13'' communicating with center of the metering-change over plunger chamber 5 with the passageway 7 formed in the pilot plunger 3, in such relationship that the metering plungers 4, 4' and the metering-change over plunger 5 are actuated in sequence for reciprocatory movement. Reference numerals 10, 10', 10'' and 11, 11', 11'' respectively indicate discharge openings for the lubricant distributed in a metered quantity and each of the discharge opening is communicating with the passageway formed in the outer periphery of each plunger at a location relative thereto, through which the lubricant is distributed to a machine part to be lubricated. While the chambers on both sides of the metering plungers 4, 4' and the metering-change over plunger 5 are sealably closed, the chambers on both sides of the pilot plunger 3 are communicating with the external pipes 15, 16 through the main pipe connecting ports 19, 20 respectively.

In the embodiment shown in FIGURE 1, a distributing valve assembly 14 of the present invention is communicating with other distributing valve assemblies of the same construction through the pipe line 15, 16. These pipe lines are formed in a loop and have their ends connected with a circuit change over valve 17 and a lubricant pressurizing pump 18.

Now, the operation of the distributing valve assembly according to the present invention will be illustrated hereinafter.

Referring to FIGURE 1, a high pressure lubricant supplied from the lubricant pressurizing pump 18 is sent through the change over valve 17 into the pipe line in a direction as selected by said change over valve. For instance, when the lubricant is sent under pressure in the direction shown by the solid line arrow, the other terminal end of the circuit returns to the change over valve 17 as shown by the dotted line arrow, the terminal end of the circuit being open to atmospheric pressure. This relationship is reversed when the change over valve is actuated to switch the direction. Referring now to FIGURE 2, the pressure lubricant introduced through the pipe line 15 and the connecting port 19 on the left side of the pilot plunger 3 moves the pilot plunger 3 to the position (to the right extremity) shown in the figure, as the check valve 2 is closed, thereby forcing the lubricant present in the chamber on the right hand side of the pilot plunger through the connecting port 20 into the pipe line 16 connected to the next distributing valve assembly.

The rightward movement of the pilot plunger 3 opens the passageway 8 allowing the pressure lubricant to proceed into the left side chamber of the metering plunger 4 therethrough, whereupon the metering plunger 4 is moved to the right to be in the position (right extremity position) shown in the figure to thereby discharge the lubricant present in the chamber on the right hand side of said plunger from the discharge opening 11 through the passageway 9 and a passageway formed in the outer periphery of the pilot plunger 3 in an amount which is to be determined by the diameter and stroke of the metering plunger 4.

Successively, the pressure lubricant proceeds into the metering plunger 4' through the passageway 8' which is now open and thereby the metering plunger 4' is moved to the right, with the consequence that the lubricant present in the chamber on the right hand side of said plunger flows through the passageway 8 and a passageway formed in the outer periphery of the metering plunger 4 and is discharged from the discharge opening 11' in a metered quantity as described previously. The pressure lubricant finally proceeds into the metering-change over plunger chamber through the passageway 8" to move the metering-chaange over plunger to the right and the lubricant present in the chamber on the right hand side of said plunger is discharged through the discharge opening 11" in the manner previously described. Upon completion of the rightward movement of the metering-change over plunger, the central lubricant return passageway 13" is opened, so that the pressure lubricant flows through 13 to 13' to 13" and thence through a central passageway formed in the outer periphery of the pilot plunger 3 into the passageway 7 and into the passageway 6, whereupon the check valve 2' is pushed open and the lubricant is permitted to flow into the next distributing valve assembly through the external connecting port 20 and the pipe line 16. To this point, the distributing valve assembly has completed a half of its operation.

When all of the distributing valve assemblies connected in the manner shown in FIGURE 1 has completed a half of their operation, all in the similar manner as described above, the pressure lubricant returns to the change over valve 17, whereupon the change over valve 17 is switched to direct the lubricant in the circuit in the opposite direction and thus the lubricant is circulated under pressure in the direction opposite to that mentioned above.

As such, each of the plungers shown in FIGURE 2 operates symmetrically in the direction opposite to that mentioned before, discharging a metered quantity of lubricant through the discharge openings 10, 10', 10", whereupon a complete cycle of operation of the distributing valve assembly is completed. It should be understood that the metering plungers 4, 4' may be provided in a desired number and these metering plungers arranged in the same relative positions as before operate in the similar manner as above described, regardless of the number in which they are provided.

The change over valve 17 shown in FIGURE 1 performs the circuit change over operation repeatedly under either manual or automatic control during the aforementioned operation so as to accomplish the centralized lubrication.

As has been described above, since a pair of check valves are arranged in the opposite ends of the pilot plunger which is movable in the principal body of the valve assembly, the distributing valve assembly of the present invention is capable of controlling the flow direction of a lubricant with a simple construction, without requiring a complicate pipe arrangement, and moreover, since the metering-change over plunger is arranged at the end extremity of the assembly and thereby two passage lines 8, 8', 8" and 9, 9', 9", provided adjacent both ends of each plunger chamber, are communicating alternately with the central lubricant return passageway 13, 13', 13" to form a lubricant passage, the lubricant passages are rendered simple, with no need of complicate pipe arrangement. This, together with the foregoing advantageous feature, makes it possible to provide the distributing valve assembly in an extremely small size. In addition, according to the present invention, since the lubricant is supplied through only one main pipe, no other pipes extending externally of the distributing valve assembly, it is possible to connect a large number of the distributing valve assemblies with each other. The present invention, therefore, is advantageous by far over conventional types in respect of installation, piping, maintenance and expenses involved therein.

Still further, when a number of distributing valve assemblies of the type in which metering plungers are arranged for progressive movement as in this embodiment of the invention, are connected with each other in series in single line loop of main pipe, satisfactory lubricant distributing operation of all the distributing valve assemblies used can be ascertained only by checking the operation of the last distributing valve assembly. According to another aspect of the present invention, therefore, by arranging pipes in such a manner that a lubricant from a change over valve flows through each distributing valve assembly and returns to the change over valve, there is provided a centralized lubricating system in which completion of the entire lubricating operation can be ascertained only by the operation of said change over valve.

It should be also be understood that, although in the embodiment above described, the metering plungers, operating in relation to the pilot plunger, are adapted to distribute the lubricant through three passageways formed in the outer periphery thereof, it is, of course, possible to employ a different arrangement of passageways and further that, although in the embodiment, the central lubricant return passageway 13, 13', 13" passes through each of the plunger chambers, said passageway may, of course, be formed to communicate the metering-change over plunger chamber directly with the central passageway of the pilot plunger, instead of passing through each plunger chamber, with no change in the resultant effect.

Next, an explanation will be made hereinafter on the second embodiment of the present invention shown in FIGURES 4, 5 and 6.

In FIGURES 4 and 5, the principal body 1 of the valve assembly is divided into a main valve element 101, distributing valve elements 102 and 103, and a distributing-change over valve element 104, said valve elements being tightened with each other by means of bolts 22, with a sheet packing 21 intervening between the contacting surfaces of adjacent valve elements.

Figure 6:
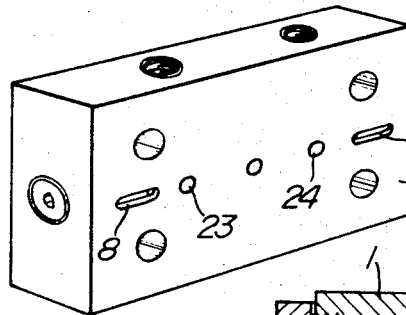
FIGURE 6 is a perspective view of a valve element of the second embodiment.

FIGURE 6 is a perspective view of the distributing valve elements 102 and 103. The cross-sectional side elevation shown in FIGURE 5 is taken on the line passing through discharge passages 23, 23', 23" and 24, 24', 24".

This modified type of distributing valve assembly operates in the same manner as the embodiment illustrated in the first place.

Now, the advantageous features of the distributing valve assembly of the present invention will be discussed in comparison of a distributing valve assembly of the type in which the assembly is assembled with each valve element as in this embodiment, with prior art methods having an appearance corresponding to the former. As prior arts, those disclosed in U.S. Patent No. 2,792,911, U.S. Patent No. 2,834,433, and U.S. Patent No. 3,025,929 are known.

Any of the distributing valve assemblies of centralized lubricating systems according to the foregoing prior arts is used by being connected as shown in FIGURE 8, where there are a great number of parts desired to be lubricated and the quantities of lubricant required vary greatly. In FIGURE 8, a lubricant which is supplied under pressure by a pressurizing pump 28 flows through a pipe line 29 into a first stage distributing valve assembly 30, from which the lubricant is distributed in a desired number of paths in metered quantities by means of plungers arranged therein.

The quantity of lubricant to be discharged is determined by the diameter and stroke of the metering plunger in the distributing valve assembly. The distributing valve assembly 30 discharges the metered quantity of lubricant to each discharge opening successively, and this cycle repeats itself, as long as the pressure lubricant is fed therein from the pressuring pump 28. The first stage distributing valve assembly 30 is followed by the second stage distributing valve assemblies 31 or further by the third stage distributing valve assemblies 32 in sequence in the number corresponding to the number of parts to be lubricated, all of the first, second and third stage distributing valve assemblies being of exactly the same construction.

The centralized lubricating system thus formed, however, has encountered practical difficulties which will be described below. Now, let's consider, for instance, the quantity of lubricant to be discharged from a discharge opening 33 of the third stage distributing valve assembly 32. First of all, the quantity of lubricant discharged from this discharge opening by the indefinite cycle of operation of the distributing valve assembly in a certain fraction of the total lubricant supplied to said distributing valve assembly and this quantity is determined by the number of distributing valve elements assembled into the valve assembly and the quantity allocated to the associated metering plunger. This holds true for the second stage distributing valve assembly 31. The quantity of lubricant discharged from a discharge opening of the second stage distributing valve assembly, which is communicating with the third stage distributing valve assembly, is also a certain fraction of the total lubricant supplied to said distributing valve assembly, and the same can be said for the first stage distributing valve assembly. That is to say that the quantity of pressure lubricant required to be supplied by the pressurizing pump 28 cannot be determined only by the quantity of lubricant to be discharged from the discharge opening 33 of the final stage distributing valve assembly but it can only be determined by the value which is obtained by multiplying the discharge ratios of the first and second stage distributing valve assemblies, interposed therebetween, by each other sequentially.

This renders it highly troublesome to determine the combination of distributing valve assemblies so as to meet the requirement of lubricating a number of parts with desired quantities of lubricant which vary greatly for the parts to be lubricated, in planning the provision of the centralized lubricating system in a machine, and hence it is impossible to merely allocate one distributing valve element to one desired quantity of lubricant. The situation will be more complicated when addition or modification of a machine to be lubricated is effected subsequent to the installation of the lubricating system, because the addition or replacement of one distributing valve element in the system results in change in the lubricant discharge ratio at the discharge openings of the stages which follow, thus making it necessary to re-design the entire plan.

In the distributing valve assembly of the present invention, however, as will be apparent from the foregoing explanation on the construction of said valve assembly and also from FIGURES 1 and 9, the quantity of lubricant discharged from one discharge opening is entirely independent of that of other distributing valve assemblies or of the other discharge openings of the same distributing valve assembly. Therefore, the centralized lubricating system according to the present invention is indeed epoch-making which is entirely free from the above-mentioned difficulties possessed by the prior art systems. The centralized lubricating system according to the present invention is highly convenient in that, in planning lubrication of a machine, all that is required is to merely combine a desired number of distributing valve elements capable of distributing a required quantity of lubricant and the subsequent modification of the plan can be achieved only by the addition or removal of the distributing valve element associating with the portion at which the planning is modified, with no effect at all on the other existing discharge openings. Referring to FIGURE 9, reference numeral 38 indicates a pump, 37 a change over valve, 34 distributing valve assemblies of the present invention, 35 and 36 respectively connecting pipe lines and 39 and 40 indicate the joints of said pipe lines with the distributing valve assembly respectively. The system shown in FIGURE 9 operates in the same manner as that shown in FIGURE 1. As such, the distributing valve assemblies of the present invention are of the type which can be connected with each other in series in single line loop of main pipe line. A distributing valve assembly of this type having plungers arranged therein for progressive movement has been proposed, for example, by U.S. Patent No. 2,986,234 but this distributing valve assembly requires a total of four passage lines consisting of pipes for changing the passage to said valve assembly and passageways for the operation of plungers, and moreover the pipe arrangement is complicated as has been described earlier. According to the present invention, however, since a pair of check valves are arranged in the opposite ends of the pilot plunger which is movable in the casing, the distributing valve assembly of the invention is capable of controlling the flow direction of a lubricant with a simple construction, without requiring a complicate pipe arrangement, and moreover, since the metering-change over plunger is arranged in the distributing-change over valve casing at the end extremity and thereby two passage lines 8, 8', 8" and 9, 9', 9", provided adjacent both ends of each plunger chamber, are communicating alternately with the central lubricant return passage 13, 13', 13", there are required only three passage lines and thus the arrangement of lubricant passages is rendered simple, requiring no complicate pipe arrangement. This, together with the foregoing advantageous feature, make it possible to manufacture the principal body of the distributing valve assembly in an extremely small size. In addition, since the lubricant is supplied through only one main pipe, no other pipes extending externally of the distributing valve assembly, it is possible to connect a large number of the distributing valve assemblies with each other. The present invention, therefore, is advantageous by far over the conventional types in respect of installation, piping, maintenance and expenses involved therein.

Still further, when a number of distributing valve assemblies of the type in which metering plungers are arranged for progressive movement as in this embodiment, are connected with each other in series in single line loop of main pipe, satisfactory lubricant distributing operation of all the distributing valve assemblies used can be ascertained only by checking the operation of the last distributing valve assembly. By arranging pipes in such a manner that a lubricant from a change over valve flows through each distributing valve assembly and returns to the change over valve, there is provided a centralized lubricating system in which completion of the entire lubrication operation can be ascertained only by the operation of said change over valve. This advantageous feature is the same as described previously.

Figure 7:
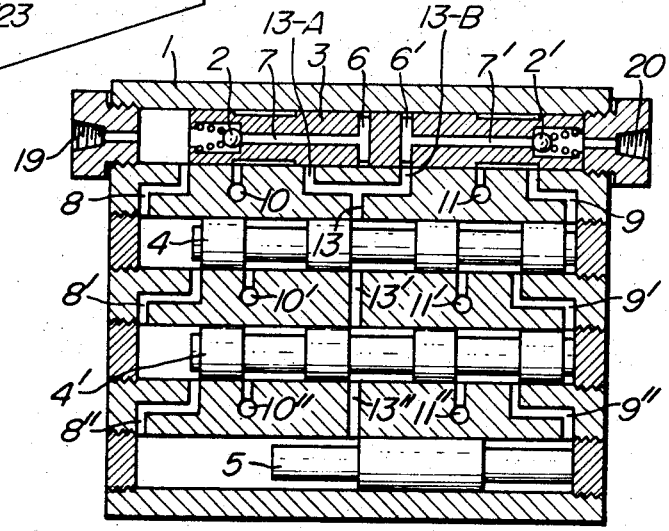
FIGURE 7 is a cross-sectional front elevation of a third embodiment of the distributing valve assembly of the invention.

Now, FIGURE 7 illustrates a third embodiment of the present invention, in which the pilot plunger 3, as in the first embodiment, is formed therein with two passageways 6, 6' and passageways 7, 7' in communication with said passageways 6, 6' respectively, said passageways 7, 7' communicating with check valves 2, 2' respectively. The plungers are associated with each other by the total of three lubricant passage lines consisting of two passage lines 8, 8', 8" and 9, 9', 9" formed adjacent both ends of each plunger chamber and a central lubricant return passageway 13, 13', 13" communicating the center of the metering-change over plunger chamber 5 with the passageways 6, 6' in the pilot plunger in such a relationship that the plungers operate in reciprocating motion in sequence. The passageway 13 is branched and contacts the pilot plunger at two locations, so that the right side passageway 13–B communicates with the passageway 6' when the pilot plunger is moved to the right extremity, while the left side passageway 13–A communicates with the passageway 6 when the pilot plunger is moved to the left extremity.

The distributing valve assembly shown in this embodiment operates as follows:

Referring to FIGURE 7, the pressure lubricant entering the left side connection port 19 of the pilot plunger 3 through the pipe line 15 moves the pilot plunger 3 to the position (to the right extremity) shown in the figure, as the check valve 2 is closed, whereupon the lubricant present in the right hand side chamber of the pilot plunger 3 is caused to proceed into the next distributing valve assembly through the connecting port 20 and the pipe line 16.

Due to the rightward movement of the pilot plunger 3, the passageway 8 is opened to permit the pressure lubricant to proceed into the left hand chamber of the metering plunger 4. Then the metering plunger 4 is moved to the right to the position (to the right extremity) shown, as a result of which the lubricant present in the right hand side chamber is discharged to the discharge opening 11 through the passageway 9 and the passageway formed in the outer periphery of the pilot plunger 3 in a predetermined quantity which is determined by the stroke of the metering plunger 4.

Successively thereafter, the pressure lubricant proceeds into the next plunger chamber through the passageway 8' which is now open and moves the metering plunger 4' to the right, whereupon the lubricant present in the right hand side chamber is caused to flow through the passageway 9' and a passageway formed in the outer periphery of the metering plunger 4 to the discharge opening 11' and discharged in a predetermined quantity as mentioned above. The pressure lubricant finally enters the metering-change over plunger chamber through the passageway 8" to move the metering-change over plunger 5 to the right and thereby the lubricant in the right hand side chamber is discharged from the discharge opening 11" in the similar manner as described before. Upon completion of the rightward movement of the metering-change over plunger 5, the central lubricant return passageway 13 is opened, so that the pressure lubricant flows through 13" to 13' to 13 and passageway 13-B to reach the passageway 6' in the pilot plunger 3 and thence enters the passageway 7, pushing the check valve 2' to open and through which the lubricant proceeds into the next distributing valve assembly through the pipe line 16. To this point, a half of the operation of the distributing valve assembly has been completed.

Similarly, all of the distributing valve assemblies of the third embodiment as connected in the manner shown in FIGURE 1 complete a half of their operation and the pressure lubricant return to the change over valve 17. Since the change over valve 17 is adapted to change the flow direction of the lubricant at this point, the lubricant in the circuit flows in the direction opposite to that mentioned above, operating each plunger in the symmetrically opposite direction in the manner mentioned before, and thereby the lubricant is discharged to the respective discharge openings 10, 10', 10" in a predetermined quantity. In this instance, the central lubricant return passageway communicates with the pipe line 15 through the passageway 13-A, passageways 6 and 7, check valve 2 and the pipe connecting port 19 to send the lubricant to the next distributing valve assembly therethrough. At this point, a complete cycle of operation of the distributing valve assembly has been over. The metering plungers 4, 4' may be provided in a desired number and these metering plungers, when provided in the relative positions mentioned above, will operate in the same manner regardless of the number in which they are provided. The change over valve 17 shown in FIGURE 1 performs circuit change over operation repeatedly under either manual or automatic control, thereby to accomplish centralized lubrication.

The specific relationship between the check valves 2, 2' provided in the pilot plunger 3, which is the critical part of the present invention, and the passageways 13-A, 13-B will now be described in further detail. In order to enable a check valve to perform a reverse flow preventing action perfectly, that is to stop leakage completely at the check point, in principle, a highly precise and complicated mechanism is required and, in addition, a fluid used must be clean and free from contamination. Practically speaking, however, such as principle can hardly be materialized in a check valve, such as those disposed in the pilot plunger 3 of the distribution valve assembly of the present invention and having a construction as described previously, either dimension-wise or expense-wise. Because, in the actual design, the pilot plunger 3 has an outer diameter of the order of 10 mm. and, on the other hand, complete purification of a lubricant used is impracticable from the standpoint of the expense involved. However, such a leakage through a check valve, even when it is to such an extent as to bring about a detrimental effect for a long period of time, is almost negligible producing no practical objectionable effect at all for only a very short period of time. Taking this fact into account, the construction of the present invention has been designed such that the check valves 2 and 2' are required to perform a reverse flow preventing action only for a very short period of time in which the pilot plunger 3 starts its operation.

Referring to FIGURE 7, for example, when the lubricant flows in the distributing valve assembly through the pipe connecting port 20, with each plunger being located at positions shown, the pressure lubricant is prevented from flowing into the passageway 7' due to the reverse flow preventing action of the check valve 2', thus causing the pilot plunger 3 to move to the left. As a result, the communication between the passageways 6' and 13-B is interrupted in a very short period of time after the pilot plunger 3 has commenced its leftward stroking. That is to say that the check valve is only required to perform its reverse flow preventing action for a very short period of time at the beginning of said stroking and subsequent leakage of the lubricant through the check valve into the passageway 7', if there is any, does not cause any adverse effect to the operation, as the passageway 6' is not open to anywhere. Due to the foregoing reason, it is possible to provide the check valves 2, 2' in a very simple construction consisting, for example, of a spring and a ball as shown in the figure and yet to use small size, inexpensive parts for the construction of the same.

It should also be noted that, by dividing the distributing valve assembly body illustrated in the third embodiment above, in the manner shown in the second embodiment, it is possible to devise another new embodiment in which the second and the third embodiments are combined. The embodiment of such a modification operates in the same manner as that shown in the third embodiment above described.

What is claimed is:

1. In a distributing valve assembly, the combination comprising a body having a plurality of chambers therein, each chamber having a first end and a second end; a pilot plunger slidably disposed in a first one of said plurality of chambers, said pilot plunger having a first check valve at a first end thereof and a second check valve at a second end thereof; a metering-change over plunger slidably disposed in a last one of said plurality of chambers; a plurality of metering plungers each slidably disposed in one of said plurality of chambers located between said first chamber and said last chamber; a first passageway connecting with the first ends of said plurality of chambers; a second passageway connecting with the second ends of said plurality of chambers; and a central return passageway connecting with said first chamber and said last chamber whereby said metering plungers operate successively to distribute lubricant and said metering-change over plunger operates to permit the lubricant to return to the pilot plunger for exit from the distributing valve assembly through one of said check valves.

2. The invention as recited in claim 1 wherein each of said plurality of chambers and its associated plunger is formed in a separate detachable block.

3. A distributing valve assembly of the type which is adapted to be connected in series with another like distributing valve assembly in a loop of pipe in a centralized lubricating system, said distributing valve assembly comprising a body having a plurality of chambers therein, each chamber having a first end and a second end; a pilot plunger slidably disposed in a first one of said plurality of chambers, said pilot plunger having a first check valve associated with a first passageway therein and a second check valve associated with a second passageway therein, said pilot plunger adapted to be connected between connecting ports of the main pipe; a metering-change over plunger slidably disposed in a last one of said plurality of chambers; a plurality of metering plungers, each slidably disposed in one of said plurality of chambers located between said first chamber and said last chamber; a passageway connecting with the first ends of said plurality of chambers; a passageway connecting with the second ends of said plurality of chambers; a central return passageway connecting with said first chamber and the center of said last chamber to permit the return of lubricant after movement of said metering-change over plunger; and said first and second passageways in said pilot plunger being formed such that said central return passageway communicates with only one of said first and second passageways and its associated check valve to permit passage of the lubricant therethrough and to isolate the other check valve whereby the lubricant is distributed by the successive operation of said metering plungers and is returned to said pilot plunger after movement of said metering-change over plunger.

4. The invention as recited in claim 3 wherein each of said plurality of chambers and its associated plunger is formed in a separate detachable block.

References Cited

UNITED STATES PATENTS

| | | | |
|---|---|---|---|
| 3,074,509 | 1/1963 | Robson | 184—7 |
| 3,219,146 | 11/1965 | Leese et al. | 184—7 |

FOREIGN PATENTS 556,917　8/1932　Germany.

HOUSTON S. BELL, Jr., *Primary Examiner.*